United States Patent
Kutkut et al.

(10) Patent No.: US 12,355,243 B1
(45) Date of Patent: Jul. 8, 2025

(54) MULTIPORT POWER MANAGEMENT SYSTEM WITH BATTERY AND CONNECTIVITY BACKUP CAPABILITIES AND RELATED METHODS

(71) Applicant: SMART CHARGING TECHNOLOGIES LLC, Oviedo, FL (US)

(72) Inventors: Nasser Kutkut, Orlando, FL (US); Anirudh Pise, Oviedo, FL (US); Thikrallah Shreah, Oviedo, FL (US)

(73) Assignee: SMART CHARGING TECHNOLOGIES LLC, Oviedo, FL (US)

( * ) Notice: Subject to any disclaimer, the term of this patent is extended or adjusted under 35 U.S.C. 154(b) by 0 days.

(21) Appl. No.: 19/058,185

(22) Filed: Feb. 20, 2025

Related U.S. Application Data

(60) Provisional application No. 63/555,606, filed on Feb. 20, 2024.

(51) Int. Cl.
  *H02J 3/00* (2006.01)
  *H02J 3/02* (2006.01)
  *H04L 12/12* (2006.01)

(52) U.S. Cl.
  CPC ........ *H02J 3/0073* (2020.01); *H02J 3/00125* (2020.01); *H02J 3/02* (2013.01); *H04L 12/12* (2013.01)

(58) Field of Classification Search
  CPC ........ H02J 3/0073; H02J 3/00125; H02J 3/02; H04L 12/12
  USPC ....................................... 307/43, 23
  See application file for complete search history.

(56) References Cited

U.S. PATENT DOCUMENTS 10,998,746 B2 * 5/2021 Kutkut .................... H02J 7/005

* cited by examiner

*Primary Examiner* — Hal Kaplan
(74) *Attorney, Agent, or Firm* — Allen, Dyer, Doppelt + Gilchrist, PA

(57) ABSTRACT

A power supply may include an AC to DC converter coupled to an AC power source to generate a DC power output, an AC port(s) to supply AC power to a respective AC load(s), an AC relay(s) coupling a respective AC port(s) to the AC power source, a DC port(s) to supply DC power to a respective DC load(s), a DC to DC converter(s) coupling the DC power output to the DC port(s), a battery(ies) coupled to the DC power output, and an ethernet port(s) to provide wired network connectivity. A controller may be configured to switch the DC port(s) between the DC power output and the battery(ies) responsive to AC power source outages, cause the AC relay(s) to cycle AC power to the AC port(s) and respective AC load(s), and cause the DC to DC converter(s) to cycle power to the DC port(s) and respective DC load(s).

27 Claims, 2 Drawing Sheets

MULTIPORT POWER MANAGEMENT SYSTEM WITH BATTERY AND CONNECTIVITY BACKUP CAPABILITIES AND RELATED METHODS

RELATED APPLICATIONS

This application claims the benefit of U.S. provisional application Ser. No. 63/555,606 filed Feb. 20, 2024, which is hereby incorporated herein in its entirety by reference.

TECHNICAL FIELD

The present invention relates generally to power supplies, and more particularly to a multi-port AC and DC power supply for powering and backing up IT equipment and remotely rebooting AC equipment.

BACKGROUND

Many of today's Automated Teller Machines (ATMs), unattended kiosks, and remote IoT monitoring equipment utilize networking devices, such as cell modems and WiFi routers, to connect to cloud servers to upload data and process payments. Almost all such equipment is powered by AC mains. When the AC power is lost, the connected equipment will be offline, ceasing to collect and upload data, or dispense product. In addition, if the networking devices hang up or malfunction, the equipment can no longer connect to the cloud servers and can no longer upload data, dispense products, or process payments. In many cases, such networking devices would require a manual reboot or onsite service to restore normal operation.

In some applications, some end users install IP-controlled AC outlets that can be controlled remotely through an ethernet port. This allows for remote rebooting of the AC-connected devices. However, if AC power is lost, then there is no visibility or ability to control the AC devices. In addition, if the networking device malfunctions, then the IP-connected AC outlet can't be controlled. In both cases, the operator of the equipment (ATM, kiosk, or IoT equipment) is not alerted or has no way of addressing the problems remotely, requiring onsite service and manual power reboot.

Other end users may use uninterruptable power supplies (UPS) to back up the networking device. While the UPS may sustain the operation of the networking device if AC power is lost for a short period, it cannot reboot the networking device if it hangs up or malfunctions.

Due to the above limitations of existing solutions, a new power management system capable of addressing remote AC reboots, as well as providing power and connectivity backup to networking devices, is needed.

SUMMARY

A power supply may include an alternating current (AC) to direct current (DC) converter coupled to an AC power source and configured to generate a DC power output, one or more AC ports configured to supply AC power to respective AC loads, one or more AC relays coupling respective AC ports to the AC power source, one or more DC ports configured to supply DC power to respective DC loads, one or more DC to DC converters coupling the DC power output to the one or more DC ports, one or more batteries coupled to the DC power output, and one or more ethernet ports configured to provide wired network connectivity. The power supply may further include a controller configured to switch the one or more DC ports between the DC power output and the one or more batteries responsive to AC power source outages, cause the one or more AC relays to cycle AC power to the one or more AC ports and their respective AC loads, and cause the one or more DC to DC converters to cycle power to the one or more DC ports and their respective DC loads.

In example implementations, the controller may be configured to cause the one or more AC relays to cycle power to the one or more AC ports and their respective AC loads responsive to a loss of ethernet network connectivity. The controller may also be configured to cause the one or more DC to DC converters to cycle power to the one or more DC ports and their respective loads responsive to a loss of ethernet network connectivity. The power supply may further include one or more load controllers coupling the one or more DC to DC converters to the one or more DC ports.

In some example implementations, the power supply may also include a wireless communications device configured to provide wireless network connectivity. By way of example, the wireless communications device may comprise a WiFi router or a cellular modem. The controller may be configured to send alerts via the wireless communications device, with the alerts including at least one of a status of the AC power source, a battery status, loss of ethernet connectivity, or restoration of ethernet connectivity. In another implementation, responsive to an AC power source outage, the controller may be configured to enter a sleep mode to conserve battery power, awaken intermittently from the sleep mode to check a status of the AC power source or ethernet network connectivity, and send alerts via the wireless communications device and/or the one or more ethernet ports while awake including at least one of a status of the AC power source, a status of ethernet connectivity, or a battery status.

In example implementations, the controller may be configured to send alerts via the one or more ethernet ports and/or the wireless communications device, with the alerts including at least one of a status of the AC power source, a battery status, loss of ethernet network connectivity, or restoration of ethernet network connectivity. The power supply may further include a charge controller coupling the DC power output to the one or more batteries and configured to determine one or more battery diagnostic parameters, and the controller may be configured to generate a battery diagnostic report based upon the one or more battery diagnostic parameters. The power supply may further include a surge protection and filter circuit coupling the AC to DC converter to the AC power source. At least one of the one or more ethernet ports may comprise a power over ethernet (PoE) port, and the power supply may further include a DC to DC PoE circuit coupling the DC power output to the at least one PoE port.

A related method for operating a controller for a power supply, such as the one described briefly above, is also provided. The method may include switching the one or more DC ports between the DC power output and the one or more batteries responsive to AC power source outages, causing the one or more AC relays to cycle AC power to the one or more AC ports and their respective AC loads, and causing the one or more DC to DC converters to cycle power to the one or more DC ports and their respective DC loads.

A related non-transitory computer-readable medium is for a controller for a power supply, such as the one described briefly above. The non-transitory computer-readable medium may have computer-executable instructions for causing the controller to perform steps including switching the one or more DC ports between the DC power output and the one or more batteries responsive to AC power source outages, causing the one or more AC relays to cycle AC power to the one or more AC ports and their respective AC loads, and causing the one or more DC to DC converters to cycle power to the one or more DC ports and their respective DC loads.

DETAILED DESCRIPTION

Example implementations will now be described more fully hereinafter with reference to the accompanying drawings. These examples may, however, be implemented in many different forms and should not be construed as limited to the specific examples set forth herein. Rather, these implementations are provided so that this disclosure will be thorough and complete. Like numbers refer to like elements throughout.

Figure 1:
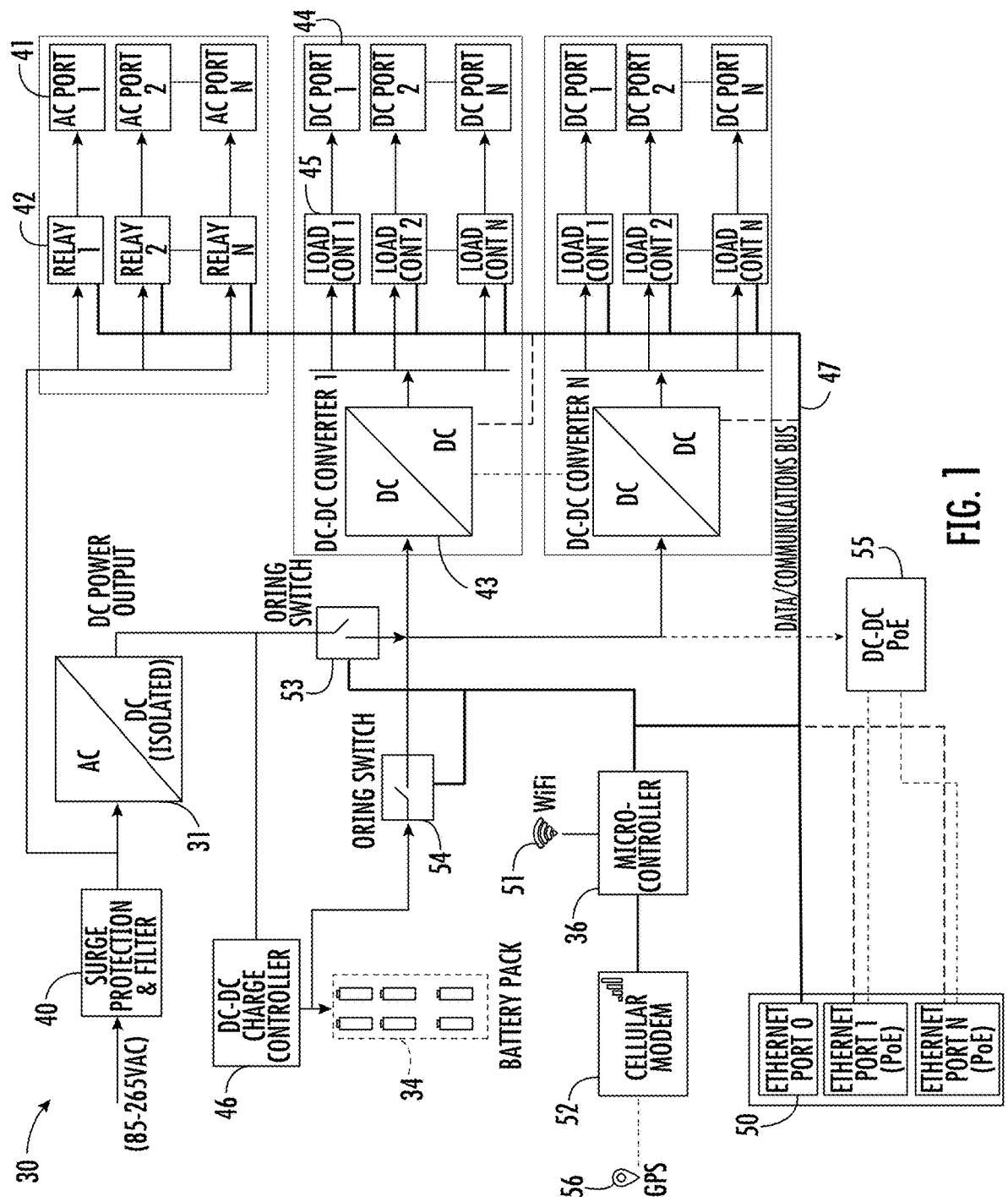
FIG. 1 is schematic block diagram of a multiport AC and DC power system in accordance with an example implementation.

Referring to FIG. 1, an example implementation of the power management system 30 is now described. In the illustrated configuration, a multiport AC and DC power management system 30 is provided with both battery and cellular backup. In the present example, the system 30 has a universal AC input (e.g., 85 Vac-265 Vac, 50/60 Hz) with AC-side surge protection and filtering circuitry 40 and an isolated AC to DC power converter 31. The system 30 further illustratively includes multiple AC output ports 41 with associated AC relays 42 that are individually controlled by a controller 36 (here a microcontroller or microprocessor). The AC to DC converter 31 converts the incoming single-phase AC input voltage into a low-voltage DC output bus voltage. Dedicated DC-DC converters 43 may be included to offer flexible DC output voltages to power various different types of DC loads. Multiple DC output ports 44 connected to the output of the DC-DC converters 43 with respective load controllers 45 are also provided to power networking devices (not shown) directly. A bidirectional DC-DC battery charger and controller 46 with battery state of charge (SoC), battery state of health (SoH) gauges, and a backup battery bank 34 are also included to provide backup power for the DC ports 44.

The microcontroller 36 is coupled to a digital data and control bus 47 for interfacing with various system elements. The microcontroller 36 may have an associated non-transitory computer-readable medium having computer-executable instructions for causing the microcontroller to perform the various operations described herein. The system 30 also illustratively includes ethernet ports 50 and a WiFi router 51 to support LAN/WiFi connectivity with the powered networking devices. Furthermore, an embedded cellular modem 52 is also included to provide connectivity backup if the main ethernet/WiFi connection is lost or becomes inactive. In the present example, the system 30 also includes a GPS module 56 to track equipment location.

The system 30 further illustratively includes transfer switches 53, 54 (Oring Switches) for switching between the output of the AC to DC converter 31 and the battery bank 34. When AC power is lost, the Oring switch 53 connected to the output of the AC to DC converter 31 is turned off while the Oring switch 54 connected to the battery bank 34 is turned on, thus powering the DC ports 44 from the backup battery. In the illustrated example, the system 30 further includes a DC-DC power stage 55 for Power over Ethernet (PoE) for one or more of the ethernet ports 50 which provide PoE capability.

The DC-DC converters 43 advantageously convert the low-voltage DC bus voltage up or down to meet the needs of different low-voltage equipment (e.g., IT equipment). For example, a step-down DC/DC converter 43 may be used to generate a low-voltage 5V DC distribution bus to power multiple 5V DC output ports 44 with load controllers 45.

The microcontroller 36 may be connected to an external modem/router through one of the ethernet ports 50, allowing for monitoring of the connectivity of the respective WiFi router 51 or cellular modem 52. Moreover, the microcontroller 36 may automatically detect and address internet outages and equipment malfunctions. For example, if no internet connectivity is detected, the microcontroller 36 can automatically recycle the DC power to the connected modem/router to restore connectivity. The microcontroller 36 configurations may be set through a cloud application or mobile phone app, for example.

During AC power loss, one or more networking equipment loads connected to the DC ports 44 will continue to be powered by the onboard battery pack 34. Furthermore, the DC ports 44 can be prioritized (or load shed) based on the battery SoC or a preset schedule.

The multiple AC ports 41 are individually controlled and can be used to recycle AC power to the main equipment, such as ATMs, kiosks, or IoT monitoring systems, for example. This can be done using a preset schedule, or remotely by the end user through an ethernet port 50, WiFi router 51, or the backup cellular modem 52.

The system 30 may also advantageously send a variety of alerts when a malfunction occurs. For example, if internet (or other network) connectivity is lost, the system 30 can leverage the integrated backup cell modem 52 and send alerts to end users notifying them that there is no internet connectivity. End users may then interact with the system 30 through the cell backup modem 52, for example, and control/configure its operation. This may include resetting one of the AC relays 42 to recycle power to the main equipment, or recycling DC power to networking equipment connected to a DC port 44. These functions can also be automatically programmed/scheduled. If AC power is lost, then the system 30 may still send alerts through the connected networking WiFi device 51 or the integrated backup cell modem 52.

The microcontroller 36 may be configured to enter into a lower power heartbeat mode that is activated during extended AC power outages (i.e., after a threshold time period). This mode provides cloud visibility even with complete power outage. For example, if AC power is lost, the system 30 may continue to power the DC-connected devices for some time (e.g., 30 minutes) and send alerts to end users via the onboard cell backup modem 52. If AC power is not restored within this time period, then the microcontroller 36 may go to sleep, thereby consuming very little power from the battery 34. The microcontroller 36 may then wake up based on a configurable schedule to send heartbeat alerts, i.e., critical diagnostic and monitoring information such as AC power loss, internet outages, faulted ports, SoC/SoH, etc., and then go back to sleep. This can allow the system 30 to continue to send alerts for many days to alert end users. End users may then opt to send service personnel to address underlying issues. The microcontroller 36 may suspend heartbeat mode once AC power is restored, and the system 30 reverts to full operation.

The microcontroller 36 controls may also set the priority of the multiple DC ports 44 based on a preset order. By way of example, the priority order of the ports may be programmed in a sequential manner where an output 12V port #1 is the most critical load, followed by port #2, and so on. During battery backup operations, when the input power fails, the microcontroller 36 can first allow all loads to continue to be supported on the DC ports 44. As the state of charge of the battery 34 declines, the microcontroller 36 can turn off the least critical load controller 45 first, then the next least critical load controller, allowing more backup time for the most critical loads. The sequence of the priority of the output ports may be programmed with a dedicated software application connected through an Ethernet port 50, for example.

The microcontroller 36 may also save various data such as power fail events, duration of power fails, total load during power fail, start SoC at the beginning of the power fail, end SoC at the end of power fail, the total projected backup time if the input power fails, etc. This data may be downloaded using a dedicated software application connected through the Ethernet port 50.

In another example implementations, the multiport power management system 30 may have an associated cloud application (Cloud App), which can save various data about the status and health of the multiport power management system. By way of example, the microcontroller 36 can be programmed to connect to the cloud application at regular intervals and upload the system's events and present status.

The microcontroller 36 controls may also perform frequent battery testing to properly assess the battery SoC and SoH. By way of example, when the AC power input is still good, the microcontroller 36 may intentionally switch from the AC to DC power supply 31 to battery 34 power using the Oring switches 53 and 54, allowing the battery to supply the load for all the connected ports for a set time. This will allow the SoC and SoH gauges to be corrected, yielding a better estimate of the total projected backup time.

The microcontroller 36, as well as the cloud app, may also send alerts to users of power failure events. In addition, the microcontroller 36, as well as the cloud app, may send alerts of the need to change the battery(ies) 34 when it reaches the end of its life.

Figure 2:
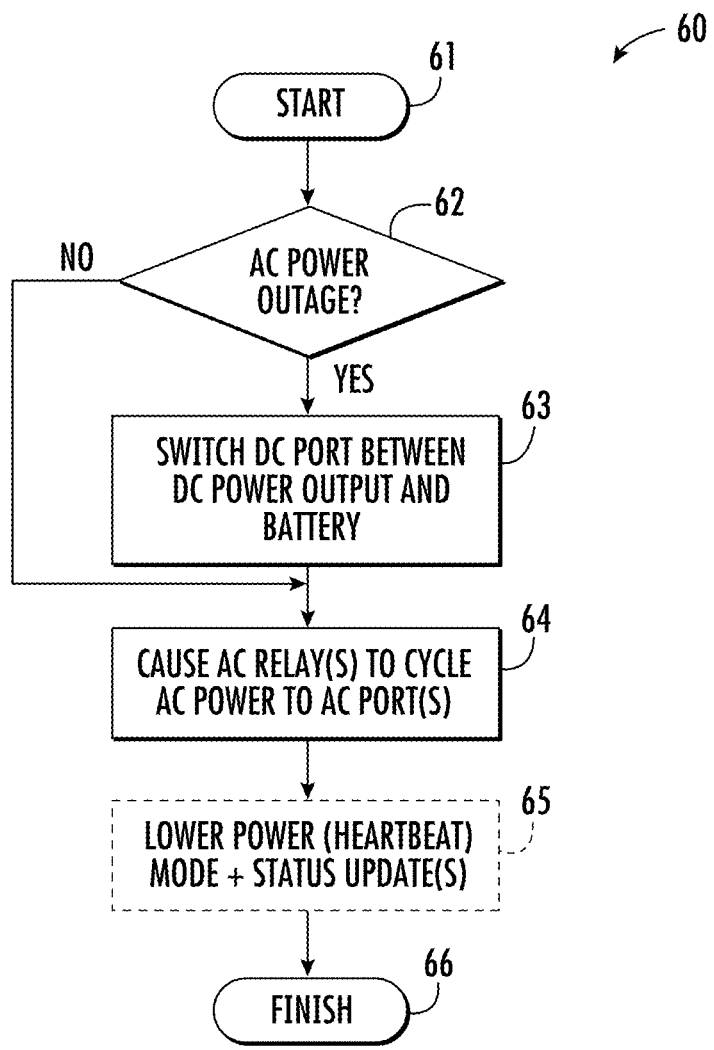
FIG. 2 is a flow diagram illustrating example method aspects associated with the power system of FIG. 1.

Referring now to the flow diagram 60 of FIG. 2, a related method for operating the controller 36 is now described. Beginning at Block 61, the method illustratively includes switching the DC ports 44 between the DC power output and the battery pack 34 responsive to AC power source outages, at Blocks 62-63. The method further illustratively includes causing the AC relays 42 to cycle AC power to the AC ports 41 and their respective AC loads, at Block 64, and causing the DC to DC converters 43 to cycle power to the DC ports and their respective DC loads, at Block 65. In some embodiments, the controller 36 may optionally enter the low power/heartbeat mode described above and awaken to send status updates as appropriate, at Block 65. The method of FIG. 2 illustratively concludes at Block 66.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A power supply comprising:
   an alternating current (AC) to direct current (DC) converter coupled to an AC power source and configured to generate a DC power output;
   one or more AC ports configured to supply AC power to respective AC loads;
   one or more AC relays coupling respective AC ports to the AC power source;
   one or more DC ports configured to supply DC power to respective DC loads;
   one or more DC to DC converters coupling the DC power output to the one or more DC ports;
   one or more batteries coupled to the DC power output;
   one or more ethernet ports configured to provide wired network connectivity; and
   a controller configured to
      switch the one or more DC ports between the DC power output and the one or more batteries responsive to AC power source outages,
      cause the one or more AC relays to cycle AC power to the one or more AC ports and their respective AC loads, and
      cause the one or more DC to DC converters to cycle power to the one or more DC ports and their respective DC loads.

2. The power supply of claim 1 wherein the controller is configured to cause the one or more AC relays to cycle power the one or more AC ports and their respective AC loads responsive to a loss of ethernet network connectivity.

3. The power supply of claim 1 wherein the controller is configured to cause the one or more DC to DC converters to cycle power to the one or more DC ports and their respective loads responsive to a loss of ethernet network connectivity.

4. The power supply of claim 1 further comprising one or more load controllers coupling the one or more DC to DC converters to the one or more DC ports.

5. The power supply of claim 1 further comprising a wireless communications device configured to provide wireless network connectivity.

6. The power supply of claim 5 wherein the wireless communications device comprises a WiFi router.

7. The power supply of claim 5 wherein the wireless communications device comprises a cellular modem.

8. The power supply of claim 5 wherein, responsive to a loss of ethernet network connectivity, the controller is configured to send alerts via the wireless communications device, the alerts including at least one of a status of the AC power source, a battery status, loss of ethernet connectivity, or restoration of ethernet connectivity.

9. The power supply of claim 5 wherein, responsive to an AC power source outage, the controller is configured to:
   enter a sleep mode to conserve battery power;
   awaken intermittently from the sleep mode to check a status of the AC power source; and
   send alerts via the wireless communications device while awake including at least one of a status of the AC power source, a status of ethernet connectivity, or a battery status.

10. The power supply of claim 5 wherein the controller is configured to send alerts via the wireless communications device, the alerts including at least one of a status of the AC power source, a battery status, loss of ethernet connectivity, or restoration of ethernet connectivity.

11. The power supply of claim 1 wherein, responsive to an AC power source outage, the controller is configured to:
   enter a sleep mode to conserve battery power;

awaken intermittently from the sleep mode to check a status of the AC power source; and send alerts via the one or more ethernet ports while awake including at least one of a status of the AC power source, a status of ethernet connectivity, or a battery status.

12. The power supply of claim 1 wherein the controller is configured to send alerts via the one or more ethernet port, the alerts including at least one of a status of the AC power source, a battery status, loss of ethernet connectivity, or restoration of ethernet connectivity.

13. The power supply of claim 1 further comprising a charge controller coupling the DC power output to the one or more batteries and configured to determine one or more battery diagnostic parameters; and wherein the controller is configured to generate a battery diagnostic report based upon the one or more battery diagnostic parameters.

14. The power supply of claim 1 further comprising a surge protection and filter circuit coupling the AC to DC converter to the AC power source.

15. The power supply of claim 1 wherein at least one of the one or more ethernet ports comprises a power over ethernet (PoE) port; and further comprising a DC to DC PoE circuit coupling the DC power output to the at least one PoE port.

16. A method for operating a controller for a power supply comprising an alternating current (AC) to direct current (DC) converter coupled to an AC power source and configured to generate a DC power output, one or more AC ports configured to supply AC power to respective AC loads, one or more AC relays coupling respective AC ports to the AC power source, one or more DC ports configured to supply DC power to respective DC loads, one or more DC to DC converters coupling the DC power output to the one or more DC ports, one or more batteries coupled to the DC power output, and one or more ethernet ports configured to provide wired network connectivity, the method comprising:

switching the one or more DC ports between the DC power output and the one or more batteries responsive to AC power source outages;

causing the one or more AC relays to cycle AC power to the one or more AC ports and their respective AC loads; and causing the one or more DC to DC converters to cycle power to the one or more DC ports and their respective DC loads.

17. The method of claim 16 wherein causing the one or more AC relays to cycle power to the one or more AC ports and their respective AC loads comprises causing the one or more AC relays to cycle power to the one or more AC ports and their respective AC loads responsive to a loss of ethernet network connectivity.

18. The method of claim 16 wherein causing the one or more DC to DC converters to cycle power to the one or more DC ports and their respective loads comprises causing the one or more DC to DC converters to cycle power to the one or more DC ports and their respective loads responsive to a loss of ethernet network connectivity.

19. The method of claim 16 wherein the power supply further comprises a wireless communications device; and further comprising sending alerts via the wireless communications device, the alerts including at least one of a status of the AC power source, a battery status, loss of ethernet connectivity, or restoration of ethernet connectivity.

20. The method of claim 16 wherein the power supply further comprises a wireless communications device; and further comprising, responsive to an AC power source outage:

entering a sleep mode to conserve battery power;

awakening intermittently from the sleep mode to check a status of the AC power source; and sending alerts via the wireless communications device while awake including at least one of a status of the AC power source, a status of ethernet connectivity, or a battery status.

21. The method of claim 16 further comprising, responsive to an AC power source outage:

entering a sleep mode to conserve battery power;

awakening intermittently from the sleep mode to check a status of the AC power source; and sending alerts via the one or more ethernet ports while awake including at least one of a status of the AC power source, a status of ethernet connectivity, or a battery status.

22. The method of claim 16 wherein the power supply further comprises a charge controller coupling the DC power output to the one or more batteries and configured to determine one or more battery diagnostic parameters; and further comprising generating a battery diagnostic report based upon the one or more battery diagnostic parameters.

23. A non-transitory computer-readable medium controlling a controller for a power supply, the power supply comprising an alternating current (AC) to direct current (DC) converter coupled to an AC power source and configured to generate a DC power output, one or more AC ports configured to supply AC power to respective AC loads, one or more AC relays coupling respective AC ports to the AC power source, one or more DC ports configured to supply DC power to respective DC loads, one or more DC to DC converters coupling the DC power output to the one or more DC ports, one or more batteries coupled to the DC power output, and one or more ethernet ports configured to provide wired network connectivity, the non-transitory computer-readable medium having computer-executable instructions for causing the controller to perform steps comprising:

switching the one or more DC ports between the DC power output and the one or more batteries responsive to AC power source outages;

causing the one or more AC relays to cycle AC power to the one or more AC ports and their respective AC loads; and causing the one or more DC to DC converters to cycle power to the one or more DC ports and their respective DC loads.

24. The non-transitory computer-readable medium of claim 23 wherein causing the one or more AC relays to cycle power to the one or more AC ports and their respective AC loads comprises causing the one or more AC relays to cycle power to the one or more AC ports and their respective AC loads responsive to a loss of ethernet network connectivity.

25. The non-transitory computer-readable medium of claim 23 wherein causing the one or more DC to DC converters to cycle power to the one or more DC ports and their respective loads comprises causing the one or more DC to DC converters to cycle power to the one or more DC ports and their respective loads responsive to a loss of ethernet network connectivity.

26. The non-transitory computer-readable medium of claim 23 wherein the power supply further comprises a wireless communications device; and further having computer-executable instructions for causing the controller to perform steps comprising, responsive to an AC power source outage:

entering a sleep mode to conserve battery power;

awakening intermittently from the sleep mode to check a status of the AC power source or ethernet network connectivity; and sending alerts via the wireless communications device while awake including at least one of a status of the AC power source, a status of ethernet connectivity, or a battery status.

27. The non-transitory computer-readable medium of claim 23 further having computer-executable instructions for causing the controller to perform steps comprising, responsive to an AC power source outage:

entering a sleep mode to conserve battery power;

awakening intermittently from the sleep mode to check a status of the AC power source or ethernet network connectivity; and sending alerts via the one or more ethernet ports while awake including at least one of a status of the AC power source, a status of ethernet connectivity, or a battery status.

\* \* \* \* \*